(12) United States Patent
Onishi

(10) Patent No.: US 6,389,356 B1
(45) Date of Patent: May 14, 2002

(54) GEOGRAPHIC INFORMATION SYSTEM

(75) Inventor: Hirofumi Onishi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/586,382

(22) Filed: Jun. 2, 2000

(30) Foreign Application Priority Data

Jun. 2, 1999 (JP) .......................................... 11-155303

(51) Int. Cl.[7] .............................................. G01C 21/00
(52) U.S. Cl. ...................... 701/209; 701/201; 340/995
(58) Field of Search ................................ 701/209, 208, 701/201; 340/990, 995; 707/103

(56) References Cited

U.S. PATENT DOCUMENTS

| | | | | | |
|---|---|---|---|---|---|
| 5,559,707 A | * | 9/1996 | DeLorme et al. | ............ | 364/443 |
| 5,731,997 A | * | 3/1998 | Manson et al. | ............. | 364/559 |
| 5,767,795 A | * | 6/1998 | Schaphorst | ................. | 340/988 |
| 5,802,492 A | * | 9/1998 | DeLorme et al. | ........... | 701/200 |
| 5,948,040 A | * | 9/1999 | DeLorme et al. | ........... | 701/201 |

FOREIGN PATENT DOCUMENTS

| | | |
|---|---|---|
| JP | 08227497 | 9/1996 |
| JP | 09245056 | 9/1997 |
| JP | 10267668 | 10/1998 |

* cited by examiner

*Primary Examiner*—Michael J. Zanelli
*Assistant Examiner*—Eric M Gibson
(74) *Attorney, Agent, or Firm*—Ratner & Prestia

(57) ABSTRACT

Records related to objects are stored in a map database (10) in ascending order of occurrences of the objects or in descending order of extinction of the objects. When objects available on a specified date are extracted, the date of the occurrences or extinction of the objects in the records are ascertained sequentially from the top. This ascertaining process is cancelled regarding the objects appearing after the specified date, or regarding the objects disappearing before the specified date. Objects seasonally available or available depending on the weather and temporary traffic regulations to be carried out irregularly are stored in the map database (10) by an operator or through a communication from a traffic control center. Those objects and regulations are not indicated on a calendar due to their irregularity. The objects agreeing with a condition can be extracted, or roads available are selected to form a passable route.

13 Claims, 3 Drawing Sheets

| Name | Generation Time | Extinction Time | |
|---|---|---|---|
| P | t1 | t2 | |
| Q | t1 | -- | |
| R | t4 | -- | |
| S | t2 | t4 | |
| | | | |
| | | | |

FIG. 3(A)

| Name | Time | | Condition |
|---|---|---|---|
| | Generation | Extinction | |
| X skiing ground | t1 | t2 | Only in winter |
| Y pavilion | t3 | t4 | Only in summer |
| Z camping ground | t5 | t6 | Close in case of rain |

| Road number | Traffic regulation | time | Day of the Week | Conditions |
|---|---|---|---|---|
| #1 | Suspension of traffic | 6:00-19:00 | | The day of attending school |
| #2 | Suspension of traffic | 9:00-12:00 | | In case of snow |
| #3 | Speed limit | 8:00-20:00 | From Monday to Friday | |

31, 32, 33, 34, 35

GEOGRAPHIC INFORMATION SYSTEM

FIELD OF THE INVENTION

The present invention relates to a geographic information system (GIS) used in navigation systems and traffic control systems, more particularly, the present invention relates to a geographic information system which searches within a short time a record containing objects such as roads and buildings stored in a map database. This system can access to an object and a traffic regulation only available under a specific condition, and take this specific information therein.

BACKGROUND OF THE INVENTION

Several prior arts have been proposed about the GIS, e.g. the Japanese Patent Application Non-examined Publication No. H09-245056 discloses an idea about storing data in a map database. The data shows occurrence and extinction of an object. The occurrence of an object indicates that the object is newly built, and the extinction of the object indicates that the object is removed. When attributes associated with the object, such as the data of occurrence and extinction of object, and the names and locations of the object, are updated, the date of the occurrence and extinction are recorded in the map database together with the map including the object. When a geographic information system searches some data, if a date is specified, the system can extract only the objects available on the date specified. Then the objects extracted can be displayed on a map or on a list.

The Japanese Patent Application Non-examined Publication No. H08-227497 discloses an idea of forming a route by selecting roads. This idea is to store temporary traffic regulations available only at a certain time, on a specified date, or during a limited period in a map database. Then the system searches roads available on a specific time and date for selecting a route on that particular date.

The conventional GIS disclosed in the Japanese Patent Application Non-examined Publication No. H09-245056 must ascertain every data about occurrence and extinction of objects stored in the map database for extracting an object available at a specified time and date. Thus this process takes a lot of time.

Another conventional GIS disclosed in the Japanese Patent Application Non-examined Publication No. H08-227497 cannot control the data such as a skiing ground, a beach house available only in a season, an emergency traffic regulation due to the weather such as snowfall or heavy rains or a temporary traffic control due to an accident, pupils' going to elementary school. Those seasonal objects and temporary regulations are not indicated on a calendar, so that the system cannot store those data therein.

SUMMARY OF THE INVENTION

The present invention addresses the problems discussed above and aims to provide a GIS that can extracts objects available on a certain date within a short time.

Another object of the present invention is to provide a GIS which can control temporary traffic regulations or events such as seasonally available, or due to the climates, accidents or temporary agreements within a local area, although the times and dates of those temporary traffic regulations and the events are not expressed in a calendar.

The present invention thus concerns a GIS as defined in the appended claims.

BRIEF DESCRIPTION OF THE DRAWINGS

FIG. 3(A) illustrates a record structure for an object irregularly appearing and disappearing.

FIG. 3(B) illustrates a record structure for a traffic regulation irregularly carried out.

DESCRIPTION OF THE PREFERRED EMBODIMENT

An exemplary embodiment of the present invention is demonstrated hereinafter with reference to the accompanying drawings.

Figure 1:
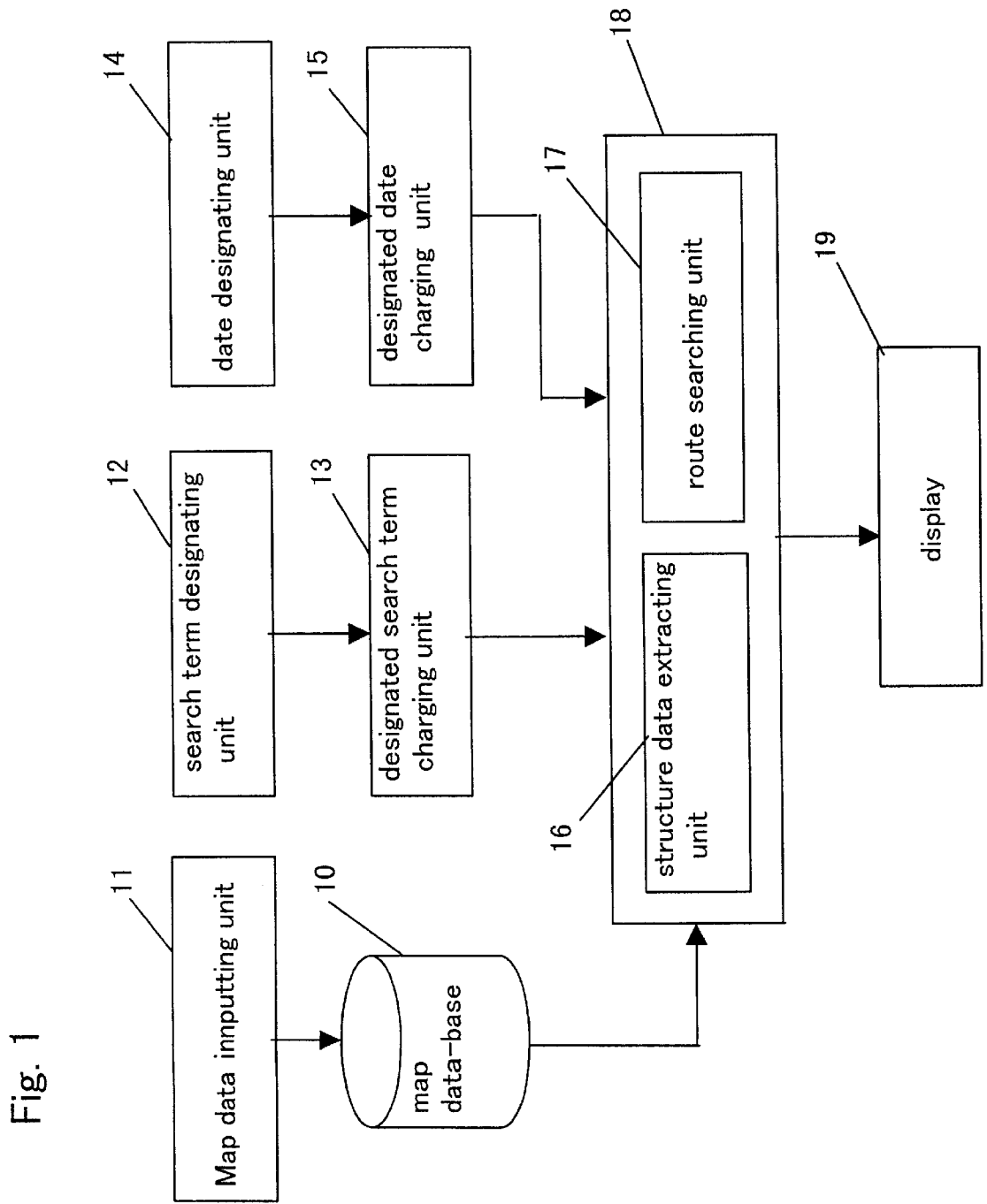
FIG. 1 is a block diagram illustrating a GIS in accordance with an exemplary embodiment of the present invention.

FIG. 1 is a block diagram illustrating a GIS in accordance with this embodiment.

In FIG. 1, map database 10 stores records of map data, types of objects to be displayed in the map, data of occurrence and extinction of those objects, and attributes associated with those objects. Users can store objects or traffic regulations available only on irregular dates into map database 10 through map-data-input-device 11. A structure of input-device 11 depends on types of data to be input. For instance, when a road map is taken into the map database as video data, a scanner is used. If the road map is stored in a CDROM, an operator of a computer downloads the data into the database. When objects irregularly available or temporary traffic regulations are taken into the database, an operator of the computer manually input those data into the database. Instead of operator's manual operation, the data can be transmitted from a traffic control center into the database. A record structure of objects and a way of storing the data of irregular objects and temporary traffic regulations are described later.

Search-condition-input-device 12 refers to as an input device such as a keyboard or a mouse. A condition for searching map database 10, e.g. which part of a map should be searched?, what objects should be displayed in the map?, what kind of data should be displayed in the map?, is input through this input-device 12. The search condition is temporarily stored in condition-retainer 13 such as a random access memory (RAM).

Time setting device 14 sets a desirable date for specifying an object or a route—available on that data and time—to be searched. The set date is temporarily stored in date-retainer 15. When the present time is set as a desirable date, the user can manually input the instant time, or the instant time can be set automatically by a clock built in the system.

Search device 18 comprises object-extractor 16 and route-selector 17, and searches map database 10 based on the search condition temporarily stored in condition-retainer 13 as well as the set date temporarily stored in data-retainer 15.

Object extractor 16 extracts an object and the associated data available on the set date. Route-selector 17 searches map database 10 for only the routes available on the set date. The objects and routes extracted are displayed together with the associated map data on display device 19. However, the objects and routes can be displayed independent of the associated map data, or the objects can be separately displayed from the routes. Respective information can be displayed on a list instead of in the map.

Figures 2A, 2B:
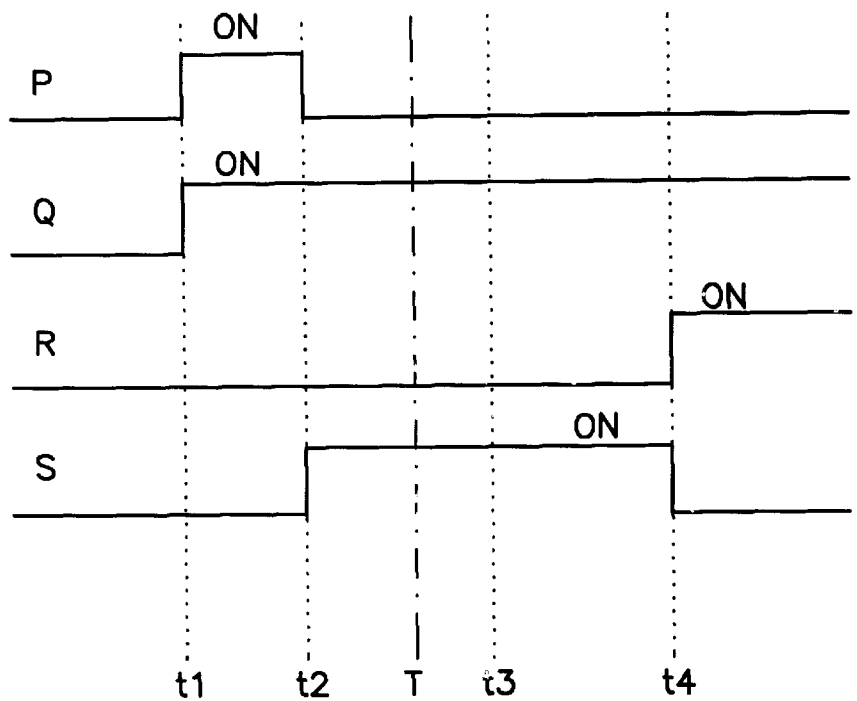
FIG. 2(A) is a time-chart stored in a map database of the GIS in accordance with the embodiment.
FIG. 2(B) is a record format used in the map database of the GIS in accordance with the embodiment.

FIG. 2 shows a storing format of a record in map database 10. FIG. 2(A) is a timetable of occurrence and extinction of objects P, Q, R and S. Object P appears at time t1 and disappears at time t2, i.e. object P is displayed in the map during a period between time t1 and time t2. Object Q appears at time t1 and does not disappear. Object R appears at time t4, and object S appears at time t2 and disappears at time t4. Those objects P, Q, R and S are stored in map database 10 in ascending order of their occurrences as shown in FIG. 2(B).

When an object available at time "T" on the timetable is extracted, the records are sequentially checked from the top to ascertain the time of occurrence. In FIG. 2(B), when record "R" is checked, since its occurrence time is after the specified time "T", checking the records after record "R" is not needed for the searching and thus the checking is cancelled.

As such, the records of objects are stored in the database in ascending order, thereby eliminating ascertainment of the times of objects having disappeared before the specified time. As a result, the objects available at the specified time can be extracted within a short time.

FIG. 3 shows record structures stored in the map database for displaying objects irregularly available due to the season or weather, or temporary traffic regulations.

FIG. 3(A) shows a record structure of an object. Object's name 21, object's occurrence and extinction date 22, and condition 23 for occurrence, extinction, and the like are stored. For instance, skiing ground X is available only in winter, and starts running from t1 and ends its operation on t2.

FIG. 3(B) shows a record structure of a temporary traffic regulation carried out irregularly. Road No. 31 to be regulated, content of regulation 32, time 33, day 34 of week, condition 35 for the regulation and the like are stored.

Since those contents of records are the objects available irregularly depending on the season or weather and temporary traffic regulations to be carried out on specified date, the user manually input those data through input device 11 into map database 10. In the case of temporary traffic regulations, those data can be downloaded wirelessly from a traffic control center into database 10.

When searching map database 10, the user inputs the condition for search, specified date through condition-input-device 12, then the objects or traffic regulations agreeing with the condition, date are extracted. Those data are displayed on display device 18 independently or together with the map data associated with those data.

The data obtained by manual operation or through radio communication are added and stored into map database 10, so that objects only seasonally available or available depending on the weather, or temporary traffic regulations can be reflected to the searching. As a result, objects agreeing with desirable search conditions can be extracted and displayed, or roads available on the specified condition, date can be selected within a short time.

What is claimed is:

1. A geographic information system comprising:
   a map database;
   a condition-input-device for inputting a search condition to search said map database;
   a search device for searching said map database based on the search condition; and
   a display device for displaying a result searched by said search device,
   wherein said map database stores object data associated with an object including a type of the object, a date of an occurrence and extinction of the object,
   wherein said object data are stored in ascending order of respective occurrence.

2. The geographic information system as defined in claim 1, wherein the search condition includes at least one of specified date and specified time.

3. The geographic information system as defined in claim 1, wherein said search device includes an object-extracting-device and a route-selector.

4. A geographic information system comprising:
   a map database;
   a condition-input-device for inputting a search condition to search said map database;
   a search device for searching said map database based on the search condition; and
   a display device for displaying a result searched by said search device,
   wherein said map database stores object data associated with an object including a type of the object, a date of an occurrence and extinction of the object,
   wherein said object data are stored in descending order of respective occurrence.

5. The geographic information system as defined in claim 4 wherein the search condition includes at least one of specified date and specified time.

6. The geographic information system as defined in claim 4 wherein said search device includes an object-extracting-device and a route-selector.

7. A geographic information system comprising:
   a map database;
   a condition-input-device for inputting a search condition to search said map database;
   a search device for searching said map database following the search condition; and
   a display device for displaying a result searched by said search device,
   wherein said map database stores object data associated with an object including a type of the object, a date of an occurrence and extinction of the object,
   wherein said object data relates to the date of the occurrence and extinction of the object, and are grouped with regard to one of a season and weather.

8. The geographic information system as defined in claim 7 wherein the associated data related to the date of the occurrence and extinction of the object are obtained by one of an operator and a communication.

9. A geographic information system comprising:
   a map database;
   a condition-input-device for inputting a search condition to search said map database;
   a search device for searching said map database following the search condition; and
   a display device for displaying a result searched by said search device,
   wherein said map database stores object data associated with an object including a type of the object, a date of an occurrence and extinction of the object,
   wherein said map database includes data related to a temporary traffic regulation to be carried out within a limited period.

10. The geographic information system as defined in claim 9, wherein the temporary traffic regulation is obtained by one of an operator and a communication.

11. The geographic information system as defined in claim 9, wherein said system searches a route by selecting a road available within the limited period through searching the temporary traffic regulation.

12. A method of searching a map database, said method comprising the steps of:

storing data corresponding to a type, an occurrence and extinction of an object; and searching the map database, where the data are stored in ascending order of the occurrence, for data scheduled before a specified date.

13. A method of searching a map database, said method comprising the steps of:

storing data corresponding to a type, an occurrence and extinction of an object; and searching the map database, where the data are stored in descending order of the extinction, for data scheduled before a specified date.

* * * * *